(12) United States Patent
Kotchick

(10) Patent No.: US 6,894,821 B2
(45) Date of Patent: May 17, 2005

(54) OPTICAL DEVICES HAVING REFLECTIVE AND TRANSMISSIVE MODES FOR DISPLAY

(75) Inventor: Keith M. Kotchick, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 9 days.

(21) Appl. No.: 10/281,582

(22) Filed: Oct. 28, 2002

(65) Prior Publication Data

US 2003/0090804 A1 May 15, 2003

Related U.S. Application Data

(60) Provisional application No. 60/358,689, filed on Nov. 9, 2001.

(51) Int. Cl.$^7$ .................................................. G02F 1/03
(52) U.S. Cl. ........................ 359/246; 359/584; 359/599; 359/496
(58) Field of Search ................................. 359/619, 251, 359/599, 625, 246, 496, 584; 349/10, 62, 65, 60; 362/31, 32, 302, 309, 339, 558; 385/901

(56) References Cited

U.S. PATENT DOCUMENTS

| | | | |
|---|---|---|---|
| 5,339,179 A | | 8/1994 | Rudisill et al. |
| 5,600,462 A | * | 2/1997 | Suzuki et al. ................ 349/112 |
| 5,751,388 A | | 5/1998 | Larson |
| 6,002,829 A | | 12/1999 | Winston et al. |
| 6,008,871 A | * | 12/1999 | Okumura ...................... 349/61 |

(Continued)

FOREIGN PATENT DOCUMENTS

| | | |
|---|---|---|
| EP | 1085363 | 3/2001 |
| JP | 2001-350008 | 12/2001 |

(Continued)

OTHER PUBLICATIONS

Pending claims from co–pending U.S. patent application 09/871,130, filed May 31, 2001. (The specification of application 09/871,130 includes the same information as found in U.S. Patent No. 6,515,785 to Cobb, Jr. et al., which was previously cited by the Examiner.).

(Continued)

*Primary Examiner*—Hung Xuan Dang
*Assistant Examiner*—Tuyen Tra
(74) *Attorney, Agent, or Firm*—William D. Miller

(57) ABSTRACT

Display apparatuses are shown capable of displaying information in a reflective mode using only ambient light and in a transmissive mode using a light source. In one embodiment, the display apparatus includes a reflecting polarizer disposed between a light modulating layer and an isotropic light cavity. The light cavity reflects incident light with a first degree of depolarization. The reflecting polarizer reflects light with a second degree of depolarization for at least one polarization that is greater than the first degree of depolarization. In another embodiment of the display apparatus, a microstructured film is included above a light cavity and below a light modulating system where the microstructured film includes sawtooth formations having at least a tilted surface. In another embodiment of a dual-mode display device, the display includes a cholesteric reflecting polarizer disposed between a light modulating layer and a light cavity where the light cavity causes a polarization phase shift upon reflectance.

50 Claims, 6 Drawing Sheets

U.S. PATENT DOCUMENTS

| | | | |
|---|---|---|---|
| 6,044,196 | A | 3/2000 | Winston et al. |
| 6,111,696 | A | 3/2000 | Winston et al. |
| 6,088,079 | A | 7/2000 | Kameyama et al. |
| 6,124,905 | A | 9/2000 | Iijima |
| 6,181,394 | B1 | 1/2001 | Sanelle et al. |
| 6,259,496 | B1 * | 7/2001 | Kashima ................... 349/62 |
| 6,268,961 | B1 | 7/2001 | Nevitt et al. |
| 6,515,785 | B1 * | 2/2003 | Cobb et al. ............ 359/247 |
| 6,671,452 | B2 * | 12/2003 | Winston et al. ......... 385/146 |
| 2001/0003473 | A1 | 6/2001 | Galabova et al. |

FOREIGN PATENT DOCUMENTS

| | | |
|---|---|---|
| WO | WO 9517692 | 6/1995 |
| WO | WO 9732226 | 9/1997 |
| WO | WO 00/49453 | 8/2000 |
| WO | WO 00/65385 | 11/2000 |
| WO | WO 01/79923 | 10/2001 |

OTHER PUBLICATIONS

A. Mosley et al. "19.5 Reflective Backlights for Liquid Crystal Displays," Society for Information Design 2001 Digest, Jun. 4, 2001.

Author Unknown, "421–57D Casio Develops TFT LCD That is Easier To View," Nikkei/DJ Japan Report, Jun. 29, 2001.

Information regarding Casio Cellular Phone, Model No. AU C413S, On sale in Japan as early as Jan. 2002.

* cited by examiner

OPTICAL DEVICES HAVING REFLECTIVE AND TRANSMISSIVE MODES FOR DISPLAY

This application claims priority to U.S. Provisional Application No. 60/358,689, filed Nov. 9, 2001.

FIELD OF THE INVENTION

The present invention generally relates to optical devices that can display information in both a reflective mode and a transmissive mode.

BACKGROUND OF THE INVENTION

Many hand-held electronic devices, such as cellular phones, include displays that can operate using both ambient lighting or backlight illumination for image formation. Such displays are said to operate in both a transmissive mode and a reflective mode and are commonly referred to as transflective displays. These displays use ambient light when it is available and a backlight only where necessary or selected by the user. The reduced reliance on the backlight decreases power consumption, allowing longer battery life.

Such transflective displays include a transflector layer that may be a partial or patterned metal mirror, or a clear polymer loaded with appropriate reflective particles. This transflector layer is designed to both reflect ambient light for use in creating a display in the reflective mode and to transmit light from a backlight for creating a display in the transmissive mode. The transflector layer provides an intensity balance between the two operational modes. If the transmissive qualities of the transflector are increased to improve lighting during backlit or transmissive operation, then less ambient light will be reflected by the transflector layer, thereby decreasing display brightness during the reflective or ambient mode operation. Conversely, improving the transflector reflectivity will increase ambient brightness, but sacrifice brightness during backlit operation.

SUMMARY OF THE INVENTION

In one embodiment, a display apparatus is capable of displaying information in a reflective mode using only ambient light and in a transmissive mode using a light source, where the display apparatus includes a reflective polarizer and an isotropic light cavity having a reflector. The light cavity reflects an incident light with a first degree of depolarization of the incident light. The reflecting polarizer, disposed between a light modulating layer and the light cavity, is adapted to transmit the component of incident light having a first polarization and reflect a component of the incident light having a second polarization. The reflecting polarizer reflects the light of the second polarization with a second degree of depolarization greater than the first degree of depolarization to provide some light of the first polarization. Preferably, the display apparatus does not include a transflector layer. In one embodiment, the light cavity substantially maintains a polarization state in reflection.

In a second embodiment of the present invention, a display apparatus includes a first microstructure film located above a light cavity and below a light modulating system. The first microstructured film includes sawtooth formations where the sawtooth formations each include a tilted surface. When ambient light strikes the first microstructured film, a first portion of incident energy of the ambient light is refracted in a first angular direction, and a second portion of the incident energy of the ambient light is refracted in a second angular direction different than the first angular direction. This display can operate using only ambient light or only light from the light source. Preferably, the display apparatus does not include a transflector layer. The sawtooth formations may include prisms or pyramid shapes. In a third embodiment of the display apparatus, a second microstructure film is included in the display apparatus.

In a fourth embodiment of the present invention, a display apparatus includes a light modulating system, a light cavity adapted to selectively provide light to the light modulating layer, and a cholesteric reflecting polarizer. The light cavity is configured to cause a polarization phase shift upon reflectance. The cholesteric reflecting polarizer is disposed between the light modulating layer and the light cavity and is adapted to transmit a component of incident light having a first polarization and reflect a component of the incident light having a second polarization. This display can also operate using only ambient light or only light from the light source. Preferably, the display apparatus does not include a transflector layer.

BRIEF DESCRIPTION OF THE DRAWINGS

The invention may be more completely understood in consideration of the following detailed description of various embodiments of the invention in connection with the accompanying drawings.

Figure 1:
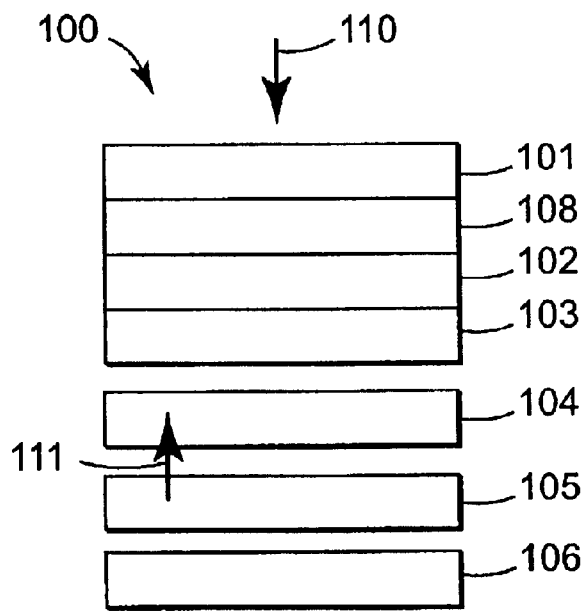
FIG. 1 illustrates a cross-sectional view of an exemplary display apparatus in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is applicable to a number of different optical devices having a display that can operate in a reflective mode and in a transmissive mode. This dual-mode operation may be accomplished without the use of a transflector layer. While the present invention is not so limited, an appreciation of various aspects of the invention will be gained through a discussion of the examples provided below.

FIG. 1 illustrates a display apparatus that does not include a transflector layer above the backlight cavity. The display apparatus 100 of FIG. 1 includes a first polarizer 101 and a second polarizer 103 surrounding a light modulator layer 102. A compensation or retardation film 108 may be included to correct for birefringence or provide other improved viewing characteristics for the light modulating layer. Display 100 includes a light cavity 105 that provides light to the light modulating layer 102. In one embodiment, the light cavity 105 is isotropic. The backlight or light cavity 105 includes a light source that may be, but is not limited to, an edge lit wave guide using light emitting diodes or fluorescent lamps to provide an area source for display illumination. Other possibilities for a light source include an electroluminescent panel, an organic light emitting diode, or an area fluorescent lamp. The term "light cavity" refers to a cavity that provides light. Preferably, the light cavity 105 is substantially optically isotropic so that the polarization of the light passing through it is not substantially altered. The display 100 also includes a bottom reflector 106 that directs light from the light cavity toward the light modulating layer. The bottom reflector also reflects ambient light and directs it toward the light modulating layer.

Another possible light source is an edge-illuminated light guide that directs light below the edge-illuminated light guide within a range of angles to the reflector. This type of light source is sometimes referred to as a front light because it is often used in display devices above a light modulating layer. A front light may be structured to provide an image-splitting layer. This function is useful in reducing pixel shadowing effects, as will be described in more detail herein.

Display 100 further includes a reflective polarizer 104 that transmits a first polarization state along its transmission axis and provides depolarized reflection of a first and second polarized state along its reflection axis. If incident polarized light contains only a first polarization state (P1) aligned along the transmission axis of reflective polarizer 104, then P1 light will be substantially transmitted with little depolarization. One example of a reflective polarizer that can be used is DRPF manufactured by 3M. Preferably, backlight elements 105 and 106 have little depolarization for at least one polarization state.

The terms "polarization" and "depolarization" will now be discussed. Polarization refers to an ordered state of light. In other words, for a polarized beam of light, the orientation of the electric field vector is predictable. This orientation specifies that the electric field vector maintain a constant direction of oscillation or vary spatially with a regular manner. The orientation may be an oscillation parallel or perpendicular to a reference plane, as in the case of linearly polarized light, or may be a rotating state about the direction of light propagation, as in the case of circularly or elliptically polarized light. With any defined polarization state, an appropriate analyzer can be constructed so that in one analyzer configuration the incident polarized beam of light will be substantially transmitted while in an orthogonal analyzer configuration, the incident polarized beam of light will be substantially extinguished or blocked. An example would be illuminating the input surface of a quality dichroic linear polarizer with an incident beam of linearly polarized light. In one configuration, the dichroic linear polarizer can be made to transmit most of the incident polarized beam of light, while a rotation of approximately 90 degrees about the direction of light travel will extinguish most of the incident polarized beam of light.

For the situation of unpolarized or depolarized light, the resultant electric field vector does not always maintain a constant or predictable orientation of oscillation. As a result, an analyzer cannot be constructed so that in one configuration the incident beam of light is substantially transmitted while in a second configuration, the same incident beam of light is substantially extinguished.

The operation of the display 100 in the ambient or reflective mode will now be described. A light ray 110 entering the display from the same side as the viewer will be first polarized by polarizer 101 so that only one polarization state exits polarizer 101, for example, P1. This polarization state will then be modulated by layer 102 to be substantially blocked or passed by polarizer 103. This modulation occurs by the presence of an electric signal applied to the patterned electrodes defining pixels or discrete apertures of the light modulating layer 102. For example, in locations where the electrical signal is applied, the incoming P1 light may be modulated by the light modulating layer 102 to emerge as a polarization state (P2). In locations where the electrical signal was not applied to the light modulation layer 102, the incoming P1 light passes through the light modulation layer 102 and emerges unchanged as P1 light. Depending on the exiting polarization state, the orientation of polarizing layer 103 will act to absorb, creating the ambient black state, or transmit the light energy, creating the ambient bright state. In locations of the display where light is transmitted, the light passing through the lower polarizer 103 (for example, P1 light) proceeds to pass through the reflective polarizer 104. Preferably the reflective polarizer 104 allows light of at least one polarization state, such as P1 light, to pass through without significant depolarization. Then, the light passes through the light cavity 105 and reflects from the bottom reflector 106 with little depolarization or other losses. The bottom layer has a degree of depolarization, which will be referred to as the first degree of depolarization. Preferably, the first degree of depolarization is minimized and the light cavity substantially maintains polarization in reflection. Upon reflection, the light retraces back out of the display 100 to give the ambient bright state. If the light cavity 105 and bottom reflector 106 are substantially polarization preserving for at least this one polarization state, then the exiting light intensity will be maximized in this mode of operation. As a result, ambient brightness is optimized since the display can operate in a purely reflective mode with no transflector layer.

Preferably, a diffuse layer is provided on the reflective polarizer to provide some scattering of transmitted light, thereby widening the viewing angle. The reflective polarizer 104 may be a disperse phase reflective polarizer, such as DRPF film manufactured by 3M. In addition, appropriate adhesive layers may be incorporated into the display 100, though not illustrated. For example, a polarization preserving diffuser may be positioned anywhere along ray path 110 to provide some scattering to widen the viewing angle of the display 100.

During backlit or transmissive operation, ray 111 exits the light cavity 105 in a specular or diffuse direction. Ray 111 is generally unpolarized, containing first and second polarization states P1 and P2. Both polarization states impinge on the reflective polarizer 104. One state, P1 for example, is transmitted with little depolarization through the reflective polarizer 104. The same polarization state P1 passes through the lower polarizer 103. Some polarization state P1 light is then modulated by the light modulating layer 102 to be P2 light in some locations. Where P2 light emerges from the light modulation layer it is absorbed by absorbing polarizer 101 creating the backlit dark state on the display. In other locations, P1 light passes through the light modulating layer 102 and the absorbing polarizer 101 to create the backlit bright state on the display.

Polarization state P2, as it emerges from the light cavity 105, is reflected by the reflective polarizer 104 such that a portion of the reflective energy is depolarized to include both polarization states, P1 and P2. The reflective polarizer 104 reflects light with a degree of depolarization, which will be referred to as the second degree of depolarization. Upon re-entry into the light cavity 105, and reflection from the bottom reflector 106, these two polarization states are substantially maintained. The reflection of the polarization states P1 and P2 toward reflective polarizer 104 allows polarization state P1 to be transmitted by the reflective polarizer 104 and depolarized reflection of polarization state P2 by the reflective polarizer 104. This recycling continues until all of polarization state P2 has been converted into polarization state P1, or until absorption losses decrease the intensity of polarization state P2 below a usable level.

Recycling of one polarization state is achieved by having a reflective polarizer with at least some reflective depolarization for at least one polarization state. The bottom reflector has a first degree of depolarization upon reflection while the reflective polarizer has a second degree of depolarization upon reflection. The second degree of depolarization is larger than the first degree of depolarization. Accordingly, light of one polarization state is recycled to provide a brighter display in the transmissive mode.

One way to determine whether a reflecting polarizer has a degree of depolarization in reflection that is greater than a degree of depolarization of a light cavity in reflection is to use two absorbing polarizers to separately test the degree of depolarization of each component. First, a light source is positioned to direct light through a first absorbing polarizer that absorbs light of a first polarization state and transmits light of a second polarization state. The light of the second polarization state emerging from the first absorbing polarizer is directed onto the component to be tested, either the reflecting polarizer or the light cavity. The light reflected from the test component is directed through a second absorbing polarizer that absorbs light of the first polarization state and transmits light of the second polarization state. The brighter the output from the second absorbing polarizer, the less depolarization has occurred at the test component. The measurement of output at the second absorbing polarizer should be integrated to include both diffuse and specular reflection. A variety of incident illumination positions and detector positions may be used, as known in the art. The proper alignment of the components of the test apparatus is also important.

Many different constructions are possible for the light cavity 105 and the bottom reflector 106. Some of these alternatives are illustrated and discussed in relation to FIGS. 5–11, herein.

Figure 2:
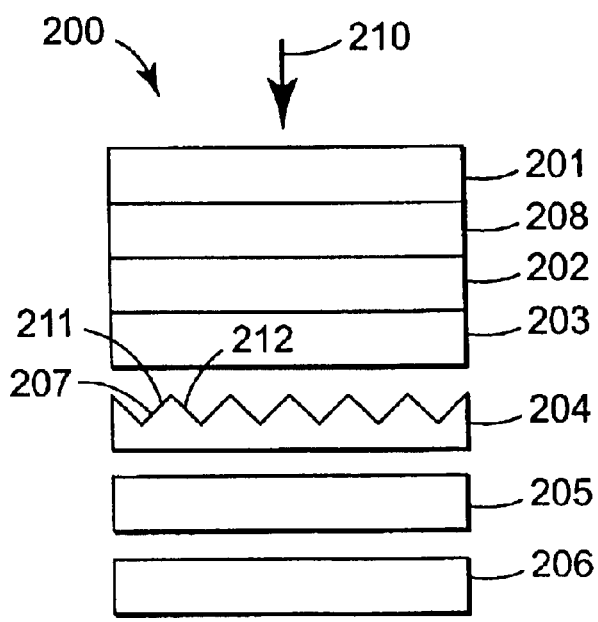
FIG. 2 illustrates a cross-sectional view of an exemplary display apparatus in accordance with another embodiment of the invention.

FIG. 2 illustrates a dual mode display 200, including a microstructured film 204. The dual mode display 200 also includes a first polarizer 201, a light modulating layer 202 and a second polarizer 203. A compensation or retardation film 208 may be included to correct for birefringence or provide other improved viewing characteristics for the light modulating layer. A light cavity 205 and a bottom reflector 206 are also provided in the display 200. The reflector 206 is used to direct light toward the light modulating layer 202 for creating a display in both the ambient and the backlit modes. Accordingly, no transflector layer is required in display 200 and preferably no transflector layer is included in display 200.

The inclusion of the microstructured layer 204 reduces pixel shadowing effects. When the display device is in use, the light modulating layer creates a pattern of addressed pixels, or dark-state pixels. In the ambient light display mode, this pattern is reflected from the reflector back toward the viewer, and the reflected pattern is overlaid on the pattern created by the light modulating layer. If the reflection of the pattern is slightly laterally offset from the pattern itself, a lighter second image may appear when these two patterns are overlaid. Lateral displacement may be caused by the distance of the reflector from the pixel plane, or light modulating layer. The greater the distance between the light modulating layer and the reflector, the greater the pixel shadowing effect is likely to be. Accordingly, pixel shadowing is more of a concern where the reflector is at the bottom of the display, as in FIG. 2, than when the reflector or transflector is located above the light cavity as in typical transflective displays.

Figure 3:
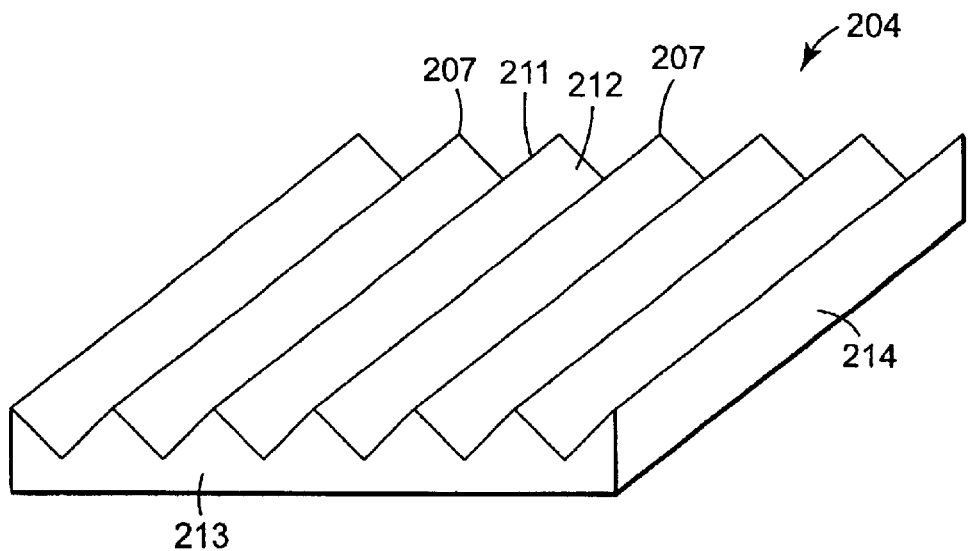
FIG. 3 is a perspective view of a microstructured film in accordance with one embodiment of the invention.

FIG. 3 is a perspective view of the microstructured film 204, which includes sawtooth formations 207 where each sawtooth formation 207 includes a first tilted surface 211 and a second tilted surface 212. In the illustrated embodiment, the sawtooth formations are prism shapes. When ambient light strikes the microstructured film 204, a first portion of the incident energy of the ambient light will strike the first tilted surfaces 211 and be refracted in a first angular direction. Correspondingly, a second portion of the incident energy of the ambient light will strike the second tilted surfaces 212 of the microstructured film and be refracted in a second angular direction that is different than the first angular direction. Because ambient light will take two different paths, any pixel shadowing effect is reduced by some portion. For example, if the microstructured film includes two types of tilted surfaces in equal proportion, as illustrated in cross-section FIG. 2, then a first half of the ambient light will be refracted in a first angular direction, and a second half of the ambient light will be refracted in a second angular direction. As a result, any pixel shadowing effect will be reduced by about one-half.

Figure 4:
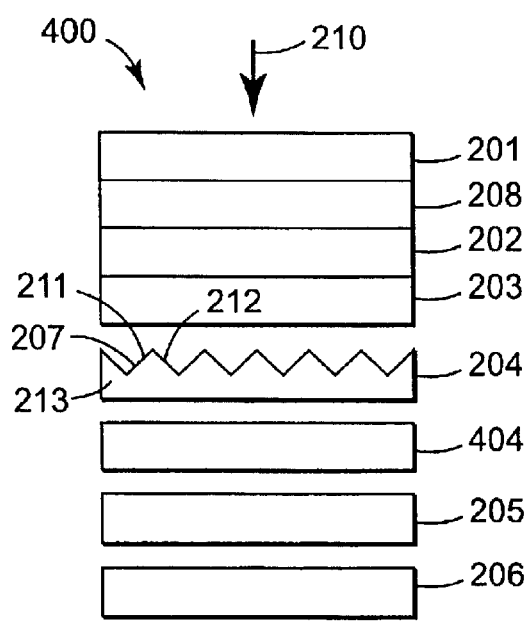
FIG. 4 illustrates a cross-sectional view of an exemplary display apparatus in accordance with yet another embodiment of the invention.

It is also possible to include a second microstructured film 404 in a display 400, as shown in FIG. 4 where the second microstructured film 404 is identical to the first microstructured film 204. In the embodiment illustrated in FIG. 3, the microstructured film 204 has a side 213 and a side 214 perpendicular to side 213. In FIGS. 2 and 4, the cross-sectional view of the first microstructured film 204 is taken parallel to side 213, so that the sawtooth formations are visible in the cross section. In FIG. 4, the cross sectional view of the second microstructured film 404 is taken parallel to the tilted surfaces, so that the sawtooth formations are not visible in the cross section. The second microstructured film 404 of FIG. 4 includes sawtooth formations (not visible in FIG. 4) that run perpendicular to the sawtooth formations 207 of the first microstructured film 204. FIG. 4 includes the same components as FIG. 2. As a result of the crossed microstructured films 204 and 404, any pixel shadowing effects will be reduced further. When light that has passed through the first microstructured film strikes the second microstructured film, a first portion of the incident energy is refracted in a third angular direction and a second portion of the incident energy is refracted in a fourth angular direction that is different than the third angular direction. Therefore, if the first microstructured film includes an equal proportion of the two types of tilted surfaces and the second microstructured film also includes equal proportions of two types of tilted surfaces, then any pixel shadowing will be reduced by a factor of about four.

The microstructured film 204 may be inverted to have the formations 207 pointing down to also serve as a turning lens to direct low angle light from the light cavity toward a viewing angle. The microstructured film 204 will be provided with an interface material that has a low index of refraction, such as air, adjacent to the sawtooth formations.

Figure 13:
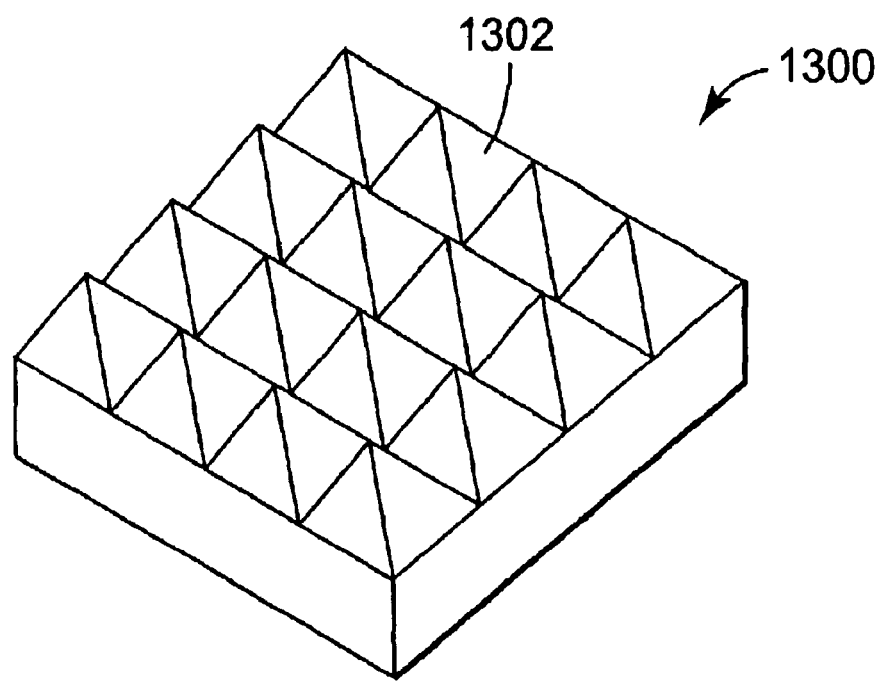
FIG. 13 is a perspective view of one embodiment of a microstructured film of the present invention.

FIG. 13 is a perspective view of a different microstructured film 1300 that may be included in one embodiment of the display apparatus, in place of microstructured film 204. Microstructured film 1300 includes sawtooth formations 1302 that are square-based pyramids. Each formation 1302 includes four tilted surfaces that will refract incident light in four different angular directions. Ambient light will strike one of the four tilted surfaces of the pyramids on the microstructured film 1300 and be refracted in one of four angular directions. Because incident light will take many different paths to the reflector, pixel shadowing will be reduced. In the example illustrated in FIG. 13, the four sides have equal areas. As a result, any pixel shadowing effects will be reduced by a factor of four for this example.

Figure 14:
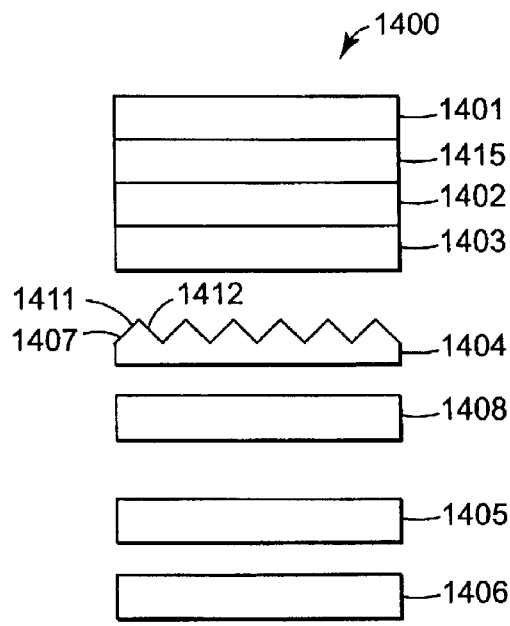
FIG. 14 illustrates yet another embodiment of a display apparatus in accordance with the present invention.

FIG. 14 illustrates another embodiment of a display apparatus 1400 of the present invention including both a microstructured film 1404 and a reflective polarizer 1408. This display apparatus also includes a first polarizer 1401, a light modulating layer 1402, a second polarizer 1403, a light cavity 1405 and a bottom reflector 1406. A compensation or retardation film 1415 may be included to correct for birefringence or provide other improved viewing characteristics for the light modulating layer.

As discussed above in relation to FIGS. 2–3, the inclusion of a microstructured film in the display apparatus results in a reduction of pixel shadowing effects. As discussed above in relation to FIG. 1, the inclusion of the reflective polarizer 1408 results in recycling of light and a brighter display. The bottom reflector 1406 reflects light with a first degree of depolarization and the reflecting polarizer 1408 reflects light with second degree of depolarization. The second degree of depolarization is greater than the first degree of depolarization, for at least one polarization state. The microstructured film 1404 includes sawtooth formations 1407 including a first titled surface 1411 and a second titled surface 1412. The sawtooth formations may be prisms as shown in FIG. 3. Another possible embodiment would be to include a second microstructured film in the display apparatus 1400, similar to the arrangement of FIG. 4.

In FIG. 14, the microstructured film 1404 and reflective polarizer 1408 are positioned to be spaced from each other, with the microstructured film 1404 on top of the reflective polarizer, where the sawtooth formations 1407 of the microstructured film 1404 face the light modulating layer 1402. The microstructured film and reflective polarizer may be positioned in many different ways within a display apparatus and still achieve a reduction in pixel shadowing and recycling of light. Some examples of other configurations for a microstructured film and reflective polarizer are illustrated in FIGS. 15–18. The configurations of FIGS. 15–18 could be used within the display apparatus 1400 of FIG. 14, replacing the microstructed film 1404 and reflective polarizer 1407.

Figure 15:
FIGS. 15–18 illustrate arrangement of a reflective polarizer and microstructured film that may be used in the display apparatus of FIG. 14 in accordance with additional embodiments of the present invention.
Figure 16:
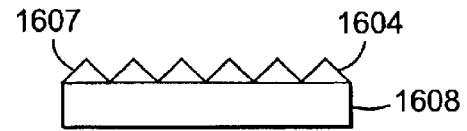

As shown in FIG. 15, a reflective polarizer 1508 may be positioned above a microstructured film 1504, where the sawtooth formations 1507 face the light modulating layer 1402 of the display apparatus 1400. As shown in FIG. 16, the microstructured film 1604 may be coupled to the reflective polarizer 1608, where the sawtooth formations 1607 of the microstructured film 1604 face the light modulating layer 1402 of the display apparatus 1400.

Figure 17:
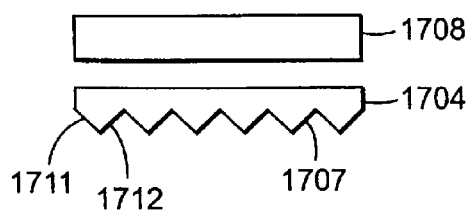

It is also possible to position a microstructured film so that the sawtooth formations face away from the light modulating layer and still achieve a reduction in pixel shadowing effects. As shown in FIG. 17, a reflective polarizer 1708 may be positioned above a microstructured film 1704, where the sawtooth formations 1707 face away from the light modulating layer 1402 of the display apparatus 1400. Each sawtooth formation 1707 includes a first tilted surface 1711 and a second tilted surface 1712. As ambient light passes through the microstructured film 1704 in this configuration, a first portion of the incident energy of the ambient light will strike the first tilted surfaces 1711 and be refracted in a first angular direction. A second portion of the incident energy of the ambient light will strike the second tilted surfaces 1712 and be refracted in a second angular direction. Because the ambient light will take two different paths, the ambient light will be reduced by some portion. If the microstructured film includes two types of tilted surfaces in equal proportion, as illustrated in FIG. 17, then the pixel shadowing effect will be reduced by one-half.

Figure 18:
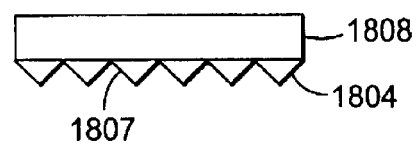

As shown in FIG. 18, a microstructured film 1807 may be coupled to a reflective polarizer 1808, where sawtooth formations 1807 of the microstructured film 1807 are positioned to face away from the light modulating layer. This construction achieves a pixel shadowing reduction in the same way as the structure of FIG. 17 when placed in a display apparatus like the display apparatus 1400.

Where a gap is shown between two components of a display device in the FIGS., typically an air gap is present between those two components. In order for the light interacting with the display device to recognize an air gap, a gap of only a few microns is sufficient. This air gap can be accomplished in many different ways known in the art. For example, a spacer element may be used. A matte layer may be used to reduce the smoothness of the surfaces of the two components. Where one of the components is a microstructured film to be layered next to a planar side of another element, such as in FIG. 15, the microstructured elements could be constructed so that not all of the tips are at the same height, allowing an optically significant air gap between the microstructured element and the adjacent component.

In the structures shown in FIGS. 16 and 18, it is not necessary to have an air gap between the microstructured films 1604, 1804 and the reflective polarizer 1608, 1808. The two elements can be bonded or coupled together. It is also possible to form the microstructured element directly on the reflecting polarizer, using the reflecting polarizer as a substrate.

It is also possible to include a microstructured film 1300 having pyramid shapes to be included in the structures of FIGS. 14–18 in place of the microstructured film. Another possible embodiment would be to include a second microstructured film in each of the structures of FIGS. 14–18, similar to the arrangement of FIG. 4.

Figure 5:
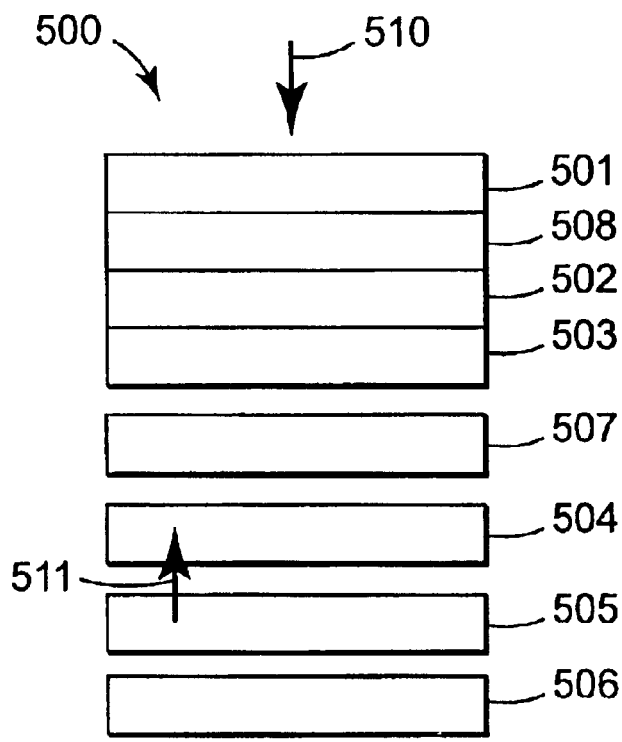
FIG. 5 illustrates a cross-sectional view of an exemplary display apparatus in accordance with another embodiment of the invention.

FIG. 5 illustrates a display apparatus that can operate in a transmissive and a reflective mode. The display 500 of FIG. 5 includes a cholesteric reflective polarizer 504. The display 500 also includes a first polarizer 501, a light modulating layer 502, and a second polarizer 503, where the first and second polarizers 501, 503 surround the light modulating layer 502. A compensation or retardation film 508 may be included to correct for birefringence or provide other improved viewing characteristics for the light modulating layer. The display 500 also includes a light cavity 505 and a bottom reflector 506. The display further includes a quarter wave film 507 in between the cholesteric reflective polarizer 504 and the second polarizer 503.

In the transmissive mode, a light ray 511 from the light cavity 505 is circularly polarized by the cholesteric reflective polarizer 504. For example, right hand circularly polarized (RH) light may be transmitted, and left hand circularly polarized (LH) light is reflected. For the transmitted light, the quarter wave film 507 constructs a linear polarization state from the RH light input for use by bottom polarizer 503. For the LH light that is reflected from the cholesteric reflective polarizer, a phase shift upon reflection from bottom reflector 506 is desired. Bottom reflector 506 is constructed to cause a phase shift upon reflection. This phase shift converts LH light to RH light for transmission by the cholesteric reflective polarizer 504. Suitable reflector materials for the bottom reflector 506 that provide high reflectivity and phase shift properties include metals like silver and aluminum, or opaque electrode metals commonly found in organic light emitting diodes.

In the reflective mode where display 500 is illuminated using ambient light transmitted through the display, incident light 510 is transmitted through the cholesteric reflective polarizer 504 and into the light cavity 505. Two phase shifts are required for the light to exit. For example, RH light transmitted by the cholesteric reflective polarizer 504 will become LH light upon reflection from the bottom reflector 506. LH is then reflected by the cholesteric reflective polarizer 504 and is sent back towards the bottom reflector 506. Upon the second reflection from the bottom reflector 506, LH light is transformed back to RH light and is finally transmitted by the cholesteric reflective polarizer 504. This multiple bounce situation can enhance lateral pixel shadowing separation. Display 500 provides a display using ambient light or light from the light source without requiring the inclusion of a transflector layer. Reduced thickness backlights, such as organic light emitting diodes, appropriate diffusion layers, and/or appropriate microstructure layers, may be beneficial to include in display 500.

The display 500 may include a front light as the light source, where an edge-illuminated light guide is configured to direct light downward toward the reflector in a viewing cone. This front light may be structured to provide an image splitting function, similar to the microstructured film 204 of FIGS. 2 and 4, thereby reducing pixel shadowing effects.

In an alternative display that also includes a cholesteric reflective polarizer, the quarter wave film 507 could be eliminated and instead the cholesteric reflective polarizer layer 504 could be provided with a coating that provides the performance of a quarter wave film.

FIGS. 6–12 illustrate configurations for a bottom reflector for the display apparatus described herein. The structures shown in FIGS. 6–12 could be used for the bottom reflector 106 of display 100, the bottom reflector 206 of display 200 of FIG. 2 or display 400 of FIG. 4, or the bottom reflector 1406 of FIG. 14.

Figure 6:
FIGS. 6–12 illustrate structures that could be used for a bottom reflector of a display apparatus in accordance with the various embodiments of the invention.

FIG. 6 shows a planar mirror 600 that provides specular reflectance. The planar mirror 600 includes a mirror layer 601 that may be, but is not limited to, an opaque aluminum or silver coating on an appropriate substrate or a multi-layer polymer mirror. Protective layers, not shown, can be applied to the mirror surface to provide improved environmental or physical performance.

Figure 7:
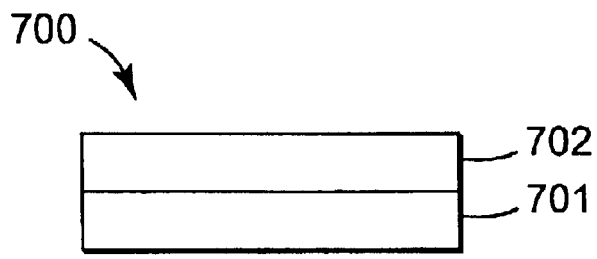

FIG. 7 shows a diffuse mirror 700, including a textured surface 702 to provide a controlled diffuse reflectance for a mirror layer 701. The mirror layer 701 may also be, but not limited to, an opaque aluminum or silver coating on an appropriate substrate or a multi-layer polymer mirror. The topography of the diffuse mirror 700 is constructed to substantially maintain at least one polarization state upon reflectance.

Figure 8:
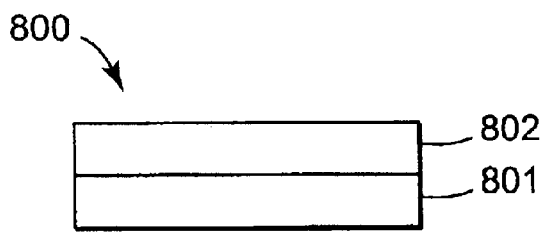

FIG. 8 shows a cross-sectional view of a diffuse mirror 800, including a mirror layer 801 and a diffuse layer 802. The mirror layer 801 may be of the type described with respect to FIGS. 6 and 7. The diffuse layer 802 may be, but is not limited to, a particle loaded coating. Parameters of the coating such as particle size, shape, refractive index, topography, and coating thickness can all be adjusted to substantially preserve at least one polarization state while providing the desired diffusion.

Figure 9:
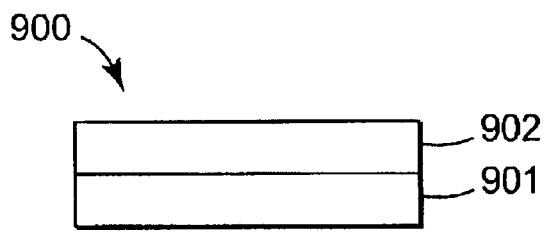

FIG. 9 shows a polarized mirror 900, including a mirror layer 901 and a reflective polarizer 902. The reflective polarizer 902 should substantially maintain polarization states in either or both reflection and transmission. Suitable examples for layer 902 include, but are not limited to, multi-layer, disperse phase or cholesteric reflective polarizers. Mirror layer 901 could either be a metalized coating, laminated metalized film, laminated polymer multi-layer mirror, or crossed reflective polarizers. Appropriate adhesive layers, not shown, may be incorporated to bond the discrete layers together. Mirror layer 901 does not have to preserve polarization in reflection since the reflective polarizer layer 902 can be oriented to provide polarized reflectivity.

For example, if light having P1 polarization is normally incident on the polarized mirror 900 and if mirror layer 901 does not substantially preserve polarization upon reflection, then the mirror layer 901 will reflect light of both P1 and P2 polarization. The reflective polarizer 902 may be configured to only allow light of P1 polarization to emerge, so that the polarized mirror 900 as a whole is polarization preserving.

Figure 10:
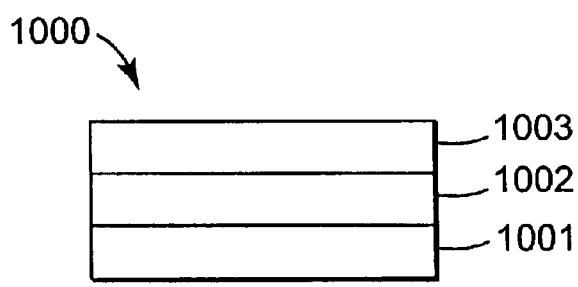

FIG. 10 shows a diffuse polarized mirror 1000, incorporating a mirror layer 1001, a diffuse layer 1002, and reflective polarizer 1003. The reflective polarizer 1003 is similar to the reflective polarizer 902 described in relation to FIG. 9. The diffuse layer 1002 may be incorporated into the one side of the construction of the reflective polarizer 1003, or may be a discrete laminated diffuse layer or diffuse adhesive. Mirror layer 1001 may be similar to the mirror layers described in relation to FIGS. 6 and 7. Appropriate adhesives, not shown, may be used to bond discrete layers together. Diffuse layer 1002 and mirror layer 1001 do not have to preserve polarization since the reflective polarizer 1003 can be aligned to provide polarized reflectivity. The diffuse polarized mirror 1000 illustrated in FIG. 10 allows for separation of the axis of scatter. Additional diffuse layers could be added to the diffuse polarized mirror 1000 above the reflective polarizer layer 1003. A suitable example of a diffuse polarized mirror 1000 would be DBEF-M film manufactured by 3M, covered with a metalized coating on the diffuse side.

Figure 11:
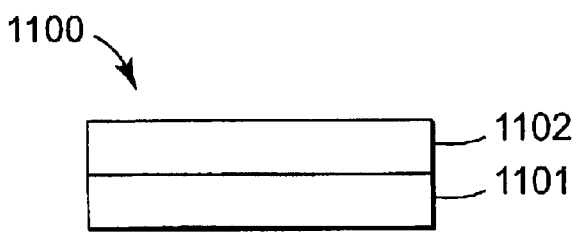

FIG. 11 shows another diffuse reflective polarizer 1100, incorporating a diffuse layer 1101 and a reflective polarizer 1102. The reflective polarizer 1102 may be of the type described in relation to FIG. 9. The diffuse layer 1101 may be a discrete laminated film, where the adhesive is not shown, consisting of, but not limited to, a micro-voided film.

A micro-voided film, also referred to as a microporous film, may be included in the diffuse reflective polarizer 1100 to provide diffused reflection. A micro-voided film is a polymer film which has tiny void areas spaced throughout. Micro-voided films can be produced using thermally induced phase separation technology. A semicrystalline polymer and a solvent or diluent are used to produce a micro-voided film. The polymer and the diluent are incompatible at low temperatures, but form a solution at higher temperatures. The polymer and diluent are heated and mixed together in an extruder until the two form a homogenous solution. This solution is then formed into a sheet and cooled. During the cooling or quenching process, the polymer crystallizes out of solution into microscopic crystalline spherulites connected by polymer tie fibrils. The size of the microstructure can be manipulated using various techniques. After the polymer has solidified, the two-phase film can be made porous by extracting the diluent and orienting the film to tailor the size of the microstructure on the order of the size of the wavelengths of light, thereby making them very efficient reflectors per unit thickness.

One micro-voided film often used in display devices is a $BaSO_4$-loaded polyethylene terephthalate (PET), having about 95% reflectivity and being about 9 mils thick. More preferably, a micro-voided $TiO_2$-loaded PET film may be used, which can have reflectance greater than 99%. Diffuse layer 1101 may be incorporated directly into one side of the reflective polarizer layer 1102. A suitable example of a diffuse reflective polarizer 1100 would be DBEF film manufactured by 3M laminated to a micro-voided film.

Figure 12:
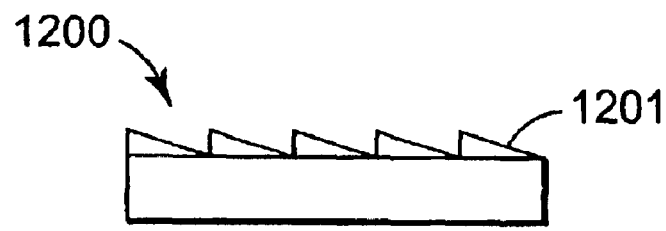

FIG. 12 shows a blazed mirror reflector 1200. The blazed mirror layer 1201 may include, but is not limited to, a tilted mirror, or diffractive or holographic structures. A blazed mirror reflector 1200 ideally preserves polarization upon reflection, but provides an angular shift in the reflectance propagation direction for use in beam steering applications.

Depending on the specific backlight design, a purely specular reflector or some degree of diffuse reflectance may be desired to optimize uniformity and brightness. Maintaining at least one axis of polarization preservation satisfies the requirement of having a substantially polarization preserving backlight cavity for the display apparatus that require this feature. A diffuse axis can aid in filling the light guide aperture. Controlling the diffusion profile of the substantially polarization preserving axis helps to maximize ambient reflected brightness. Diffusion in the backlight is desirable to widen the viewing angle for the display. However, it is also desirable to have a gain in reflection compared to a Lambertian reflection in order to have a bright display. A Lambertian reflector is assumed to reflect light with equal intensity in all directions, and hence to appear equally bright from all directions. Concerns for gain and diffusion must be balanced to provide a display that has a sufficiently wide viewing angle and is sufficiently bright. Slight diffusion to the backlight reflector can also help to minimize parallax and pixel shadowing due to the displacement of the image reflector from the image plane.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A display apparatus capable of displaying information in a reflective mode using only ambient light and in a transmissive mode using a light source, comprising:

a light modulating system comprising a light modulating layer between a first polarizing layer and a second polarizing layer;

an isotropic light cavity comprising a light source and a reflector, the light cavity adapted to selectively provide light to the light modulating layer, the light cavity reflecting incident light with a first degree of depolarization of the incident light, the reflector configured to reflect ambient light toward the light modulating layer to illuminate the display using only ambient light in the reflective mode; and a reflecting polarizer disposed between the light modulating layer and the light cavity, adapted to transmit a component of incident light having a first polarization and reflect a component of the incident light having a second polarization, the polarizer reflecting the light of the second polarization with a second degree of depolarization greater than the first degree of depolarization to provide light of the first polarization.

2. The display apparatus of claim 1 wherein the reflecting polarizer is a diffusely reflecting polarizer.

3. The display apparatus of claim 1 wherein the display apparatus does not include a transflector layer that is partially transmissive and partially reflective.

4. The display apparatus of claim 1 wherein the reflector of the light cavity is a planar mirror.

5. The display apparatus of claim 4 wherein the planar mirror includes an opaque metal coating.

6. The display apparatus of claim 1 wherein the reflector of the light cavity is a diffuse mirror.

7. The display apparatus of claim 6 wherein the diffuse mirror comprises a textured surface.

8. The display apparatus of claim 6 wherein the diffuse mirror comprises a planar mirror layer and a diffuse layer.

9. The display apparatus of claim 1 wherein the reflector of the light cavity comprises a reflective polarizer and a mirror layer, wherein the reflective polarizer of the light cavity substantially maintains a polarization state in at least one of reflection and transmission.

10. The display apparatus of claim 1 wherein the reflector of the light cavity comprises a diffuse polarized mirror comprising a reflective polarizer, wherein the reflective polarizer of the light cavity substantially maintains a polarization state in at least one of reflection and transmission.

11. The display apparatus of claim 1 wherein the reflector of the light cavity includes a beam steering layer that provides a shift in the reflectance propagation direction toward an optimal viewing angle, wherein the reflector substantially preserves polarization upon reflection.

12. The display apparatus of claim 11 wherein the beam steering layer includes mirror surfaces tilted from the horizontal.

13. The display apparatus of claim 1 further comprising a first microstructured film located above the light cavity and below the light modulating system, the first microstructured film comprising sawtooth formations, wherein the sawtooth formations each include a tilted surface; wherein ambient light strikes the first microstructured film and a first portion of incident energy of the ambient light is refracted in a first angular direction and a second portion of the incident energy of the ambient light is refracted in a second angular direction different than the first angular direction.

14. The display apparatus of claim 13 wherein the sawtooth formations are on a side of the first microstructured film facing the light modulating system.

15. The display apparatus of claim 13 wherein the first microstructured film is configured to provide an increase in a brightness of light in a range of viewing directions leaving the light cavity.

16. The display apparatus of claim 13 wherein the display apparatus does not include a transflector layer that is partially reflective and partially transmissive between the light source and the light modulating layer.

17. The display apparatus of claim 13 wherein the reflective polarizer is the first microstructured film.

18. The display apparatus of claim 13 wherein the first microstructured film is above the reflective polarizer.

19. The display apparatus of claim 13 wherein the reflective polarizer is above the first microstructured film.

20. The display apparatus of claim 1 wherein the light source comprises an organic light emitting diode.

21. The display apparatus of claim 1 wherein the light source comprises an edge-illuminated light guide configured to direct light below the edge-illuminated light guide to the reflector.

22. A display apparatus capable of displaying information in a reflective mode using only ambient light and in a transmissive mode using a light source, comprising:
   a light modulating system comprising a light modulating layer and a first polarizing layer;
   a light cavity for providing light to the light modulating layer;
   a reflector located below the light cavity and disposed to receive light from the light cavity and direct light toward the light modulating layer to illuminate the display using only ambient light in the reflective mode; and
   a first microstructured film located above the light cavity and below the light modulating system, the first microstructured film comprising sawtooth formations, wherein the sawtooth formations each include a tilted surface;
   wherein ambient light strikes the first microstructured film and a first portion of incident energy of the ambient light is refracted in a first angular direction and a second portion of the incident energy of the ambient light is refracted in a second angular direction different than the first angular direction.

23. The display apparatus of claim 22 wherein the sawtooth formations are on a side of the first microstructured film facing the light modulating system.

24. The display apparatus of claim 22 wherein each sawtooth formation comprises a prism.

25. The display apparatus of claim 24 further comprising a second microstructured film disposed below the first microstructured film, the second microstructured film comprising sawtooth formations wherein each sawtooth formation includes a prism having a tilted surface, wherein the sawtooth formations of the first microstructured film are perpendicular to the sawtooth formations of the second microstructured film; and
   wherein incident light that has passed through the first microstructured film strikes the second microstructured film and a first portion of incident energy of the incident light is refracted in a third angular direction and a second portion of the incident energy of the incident light is refracted in a fourth angular direction that is different than the third angular direction.

26. The display apparatus of claim 22 wherein the first microstructured film is configured to provide an increase in a brightness of light in a range of viewing directions leaving the light cavity.

27. The display apparatus of claim 22 wherein the display apparatus does not include a transflector layer that is partially reflective and partially transmissive between the light source and the light modulating layer.

28. The display apparatus of claim 22 wherein the sawtooth formations of the first microstructured film include pyramid structures.

29. The display apparatus of claim 28 wherein the pyramids are square-based pyramids.

30. The display apparatus of claim 22 wherein the reflector of the light cavity is a planar mirror.

31. The display apparatus of claim 30 wherein the planar mirror includes an opaque metal coating.

32. The display apparatus of claim 22 wherein the reflector of the light cavity is a diffuse mirror.

33. The display apparatus of claim 32 wherein the diffuse mirror comprises a textured surface.

34. The display apparatus of claim 32 wherein the diffuse mirror comprises a planar mirror layer and a diffuse layer.

35. The display apparatus of claim 32 wherein the reflector of the light cavity comprises a reflective polarizer and a mirror layer, wherein the reflective polarizer substantially maintains a polarization state in at least one of reflection and transmission.

36. The display apparatus of claim 22 wherein the reflector of the light cavity comprises a diffuse polarized mirror comprising a reflective polarizer, wherein the reflective polarizer substantially maintains a polarization state in at least one of reflection and transmission.

37. The display apparatus of claim 22 wherein the reflector of the light cavity includes a beam steering layer that provides a shift in the reflectance propagation direction toward an optimal viewing angle, wherein the reflector substantially preserves polarization upon reflection.

38. The display apparatus of claim 37 wherein the beam steering layer includes mirror surfaces tilted from the horizontal.

39. The display apparatus of claim 22 wherein the light cavity is isotropic and reflects incident light with a first degree of depolarization of the incident light, the reflector being configured to reflect ambient light toward the light modulating layer to illuminate the display using only ambient light in the reflective mode, the display apparatus further comprising:
   a reflecting polarizer disposed between the light modulating layer and the light cavity, adapted to transmit a component of incident light having a first polarization and reflect a component of the incident light having a second polarization, the polarizer reflecting the light of the second polarization with a second degree of depolarization greater than the first degree of depolarization to provide light of the first polarization.

40. The display apparatus of claim 39 wherein the reflecting polarizer is a diffusely reflecting polarizer.

41. The display apparatus of claim 39 wherein the display apparatus does not include a transflector layer that is partially transmissive and partially reflective.

42. The display apparatus of claim 39 wherein the first microstructured film is above the reflective polarizer.

43. The display apparatus of claim 39 wherein the reflective polarizer is above the first microstructured film.

44. The display apparatus of claim 22 wherein the light source comprises an organic light emitting diode.

45. The display apparatus of claim 22 wherein the light source comprises an edge-illuminated light guide configured to direct light below the edge-illuminated light guide to the reflector.

46. A display apparatus capable of displaying information in a reflective mode using only ambient light and in a transmissive mode using a light source, comprising:
   a light modulating system comprising a light modulating layer between a first polarizing layer and a second polarizing layer;
   a light cavity comprising a light source and a reflector, the light cavity adapted to selectively provide light to the light modulating layer, the reflector configured to reflect ambient light toward the light modulating layer to illuminate the display using only ambient light in the reflective mode, wherein the reflector of the light cavity causes a polarization phase shift upon reflectance; and a cholesteric reflecting polarizer disposed between the light modulating layer and the light cavity, adapted to transmit a component of incident light having a first polarization and reflect a component of the incident light having a second polarization.

47. The display apparatus of claim 46 wherein the display apparatus does not include a transflector layer that is partially reflective and partially transmissive between the light source and the light modulating layer.

48. The display apparatus of claim 46 wherein the light source comprises an organic light emitting diode.

49. The display apparatus of claim 46 wherein the light source comprises an edge-illuminated light guide configured to direct light below the edge-illuminated light guide to the reflector.

50. The display apparatus of claim 46 further comprising a quarter wave film disposed between the light modulating system and the cholesteric reflecting polarizer.

* * * * *